United States Patent

Payen

[11] 3,760,913
[45] Sept. 25, 1973

[54] ELECTRICAL DISTRIBUTION AND CURRENT COLLECTING SYSTEM FOR A VEHICLE TRAVELING ON A SINGLE TRACK WAY

[75] Inventor: Jean-Pol Payen, Grenoble, France

[73] Assignee: Merlin Gerin, Societe Anonyme, Grenoble, France

[22] Filed: Oct. 6, 1970

[21] Appl. No.: 78,550

[30] Foreign Application Priority Data
Dec. 2, 1969   France ............................... 6941623

[52] U.S. Cl. ............... 191/49, 104/148 LM, 191/29
[51] Int. Cl. ............................................... B60l 5/36
[58] Field of Search ...................... 191/2, 29, 45, 52, 191/49, 50, 51, 33, 34; 104/88

[56] References Cited
UNITED STATES PATENTS 3,526,731   9/1970   Cockerell ............................ 191/49
881,531    3/1908   Baukat ................................. 191/49
1,818,534  8/1931   Condon ............................... 191/49
1,825,968  10/1931  Mapson ............................... 191/29
2,903,526  9/1959   Mattox, Sr. .......................... 191/49
3,509,292  4/1970   Dehn ................................... 191/49

Primary Examiner—Gerald M. Forlenza
Assistant Examiner—Richard A. Bertsch
Attorney—Stevens, Davis, Miller and Mosher

[57] ABSTRACT

Electrical distribution and current collecting system for a vehicle traveling on a trackway having a single-track portion and means, such as end loops, for engaging the vehicle forwardly on said portion. A current collecting carriage cooperates with feed conductors disposed along said portion on one side thereof and coupling means arranged on both sides of said vehicle permit electrical and mechanical coupling to said carriage for both directions of traveling of said vehicle.

1 Claim, 4 Drawing Figures

ELECTRICAL DISTRIBUTION AND CURRENT COLLECTING SYSTEM FOR A VEHICLE TRAVELING ON A SINGLE TRACK WAY

The present invention relates to an electrical distribution and current collecting system for a vehicle traveling on a single-track way and more particularly to a transportation system comprising a vehicle capable of moving at very high speed, for instance several hundreds of miles per hour, on a trackway. The vehicle, which may be of the fluid cushion hovering type may be propelled by an electric motor, in particular a linear motor on the vehicle and which is fed by a current collecting device associated with a multiphase energizable conductor system extending parallel to the track of the vehicle.

On sections having limited traffic, a single track may be sufficient to take care of the traffic, which means travel of the vehicles in both directions on this single track. While a reversal of the direction of travel of the vehicle does not raise any problem at low speed of travel, it is, on the other hand, extremely difficult to design vehicles capable of moving in both directions of travel at high speed. This difficulty is easily avoided by providing at the ends of the single track portion turning devices such as track loops or turntables which permit travel of the vehicle in forward direction on the single-track portion.

In installations of the aforesaid type, the current feed conductor system extends laterally of the single-track, and it is easy to understand that said turning devices at the end of the path require the presence of two feed conductor systems, one on each side of the single-track portion of the vehicle.

It is an object of the present invention to remedy this drawback and to permit a feeding of the vehicle in both directions of travel of the track from a single feed system.

Another object of the present invention is to permit a substantial simplification of the infrastructures of the system.

The present invention is based on the discovery that the difficulties imposed by the reversing of the direction of travel may be overcome by using a current collecting carriage of reduced dimensions which may be made symmetrical so as to move in either direction in accordance with a movement in both directions along the path of the vehicle.

The current collecting carriage which cooperates with the feed conductors extending parallel to the path of the vehicle on one side thereof is disconnected from the vehicle at the end of the single track. The vehicle continues its course on a turning track, being fed temporarily by an auxiliary source of current, or being propelled by any desired auxiliary device, in such a manner as to again engage forwardly on the single track. In its starting position, the carriage, which was abandoned at the end of the travel is again connected to the vehicle which it will normally feed for displacement in opposite direction along the said track. The feed conductor system being arranged laterally of the single-track of the vehicle, the latter is equipped laterally on both sides with means for mechanical and electrical coupling of the carriage so that said carriage can be coupled selectively to either side of the vehicle, according to its direction of travel. The connecting system between the carriage and the vehicle is advantageously of the rapid coupling type, for instance by simple plug-in connection or fitting with automatic interlock.

Other objects and advantages of the invention will become evident from the following description of an embodiment of the invention, given by way of illustration only and shown in the accompanying drawing in which.

Figure 1:
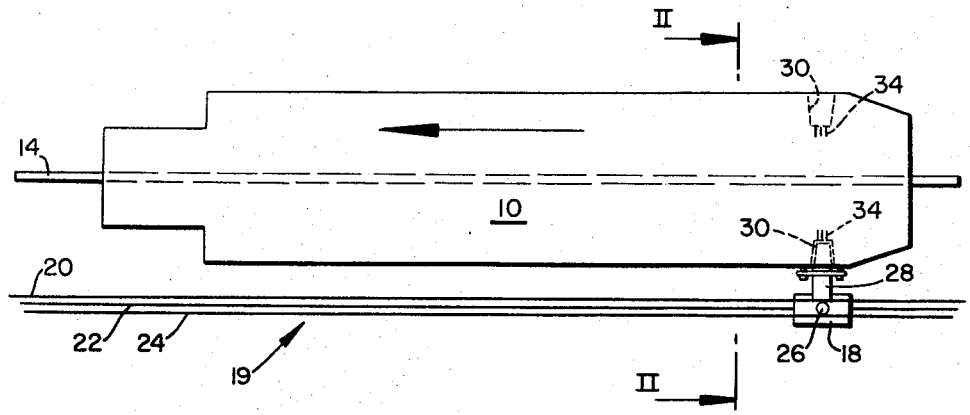
FIG. 1 shows schematically a plan view of a portion of the single-track and of a vehicle equipped with a collecting system in accordance with the invention.
Figure 2:
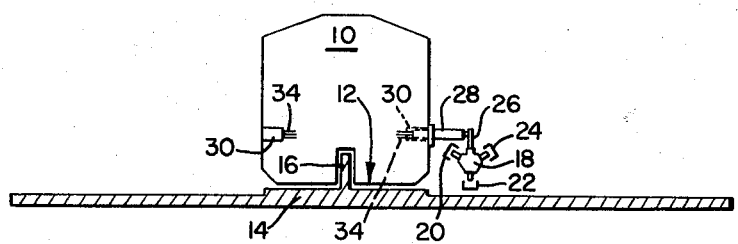
FIG. 2 is a section along the line II—II of FIG. 1.

In the figures, a vehicle 10 which is supported by a cushion of compressed air which is developed between the bottom 12 of the vehicle and the base of a trackway 14 having the shape of an inverted T is propelled along the track 14 by a linear electric motor (not shown), the armature of which is formed by the protruding plate 16 of the inverted T of the track 14 which is straddled by the vehicle 10.

Such vehicles, which are well knwon to those skilled in the art, are particularly suitable for displacement at high speeds which may reach several hundred miles per hour, but is understood that the invention is in no way limited to a transportation system of this type and that it applies to other systems such as those having vehicles having rolling members.

The electric motor provided on the vehicle 10 is fed with electric current by a current collecting carriage 18 which slides within a track 19 defined by feed conductors in the form of rails 20, 22 and 24 which extend along and on one side of the single track 14 of the vehicle. The carriage 18 which is of symmetrical shape bears current collecting brushes 21, 23, 25, which slide on the rails 20, 22 and 24 under the action of springs 27, 29, 31 while assuring the guiding of the carriage 18.

The carriage 18 is pulled by the vehicle 10 through link means, represented in the drawing by a simple connecting rod 26 secured to the carriage 18 at one of its ends, and to a male plug member 28, at the other end, said plug 28 being capable of engaging a female receptacle 30 provided for this purpose on the vehicle 10 on each of its side walls. The plug members 28 and 30 are of any desired type, but advantageously of the rapid-connecting type which permits easy and rapid connection and disconnection. The rod 26 and plug member 28 assure the mechanical coupling of the collector carriage 18 to the vehicle and also the electrical connection. To this purpose, a three conductorcable 32 connects the contact shoes 21, 23, 25 electrically directly to the input terminals 34 of the vehicle 10, the cable 32 being incorporated in rod 26 and plug 28. The mechanical coupling as shown is rigid, and its particular construction does not form part of the invention. It may be advantageous to equip the coupling means with flexible or swivel connections allowing a relative movement of carriage 18 with respect to vehicle 10.

Figure 3:
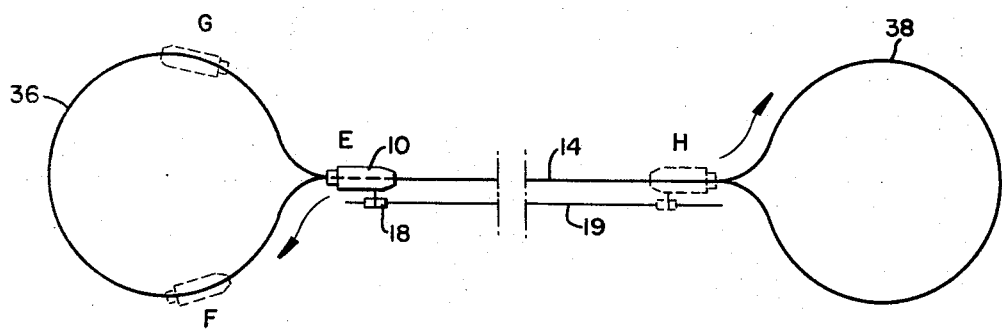
FIG. 3 is a similar view, but on a smaller scale than FIG. 1, illustrating the end stations of the single track.
Figure 4:
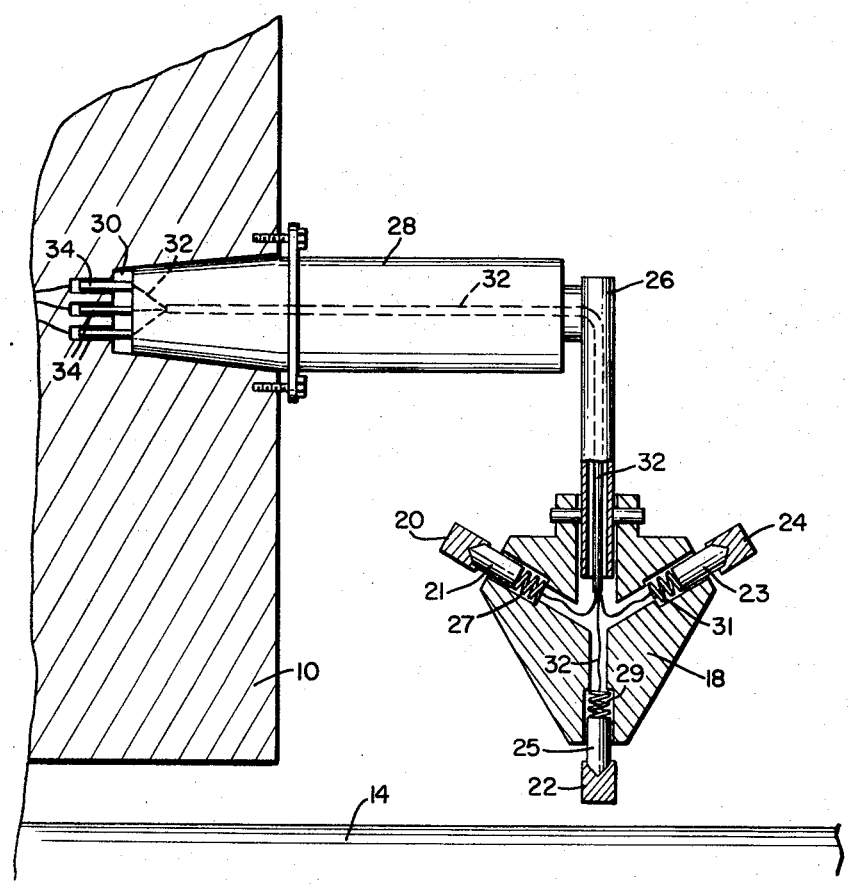
FIG. 4 is a partial cross-section illustrating an embodiment of the coupling means.

Referring to FIG. 3, it is seen that in each end station of the track 14 there is provided a turning loop 36 and 38 for the turning of the vehicle 10 and for enabling it to move over the track 14 at all times in forward operation in closed circuit. The track 19 of the carriage 18 is of a finite length corresponding to that of the single track 14.

The operation of the system in accordance with the invention is obvious and will be merely briefly summarized with reference to FIG. 3 in which the successive positions of the vehicle 10 are indicated by the letters E, F, G and H.

At the end of the forward travel at position E, the connecting plug 28 is disconnected from the receptacle 30 of the vehicle 10 so as to disconnect the carriage 18 from the vehicle 10 which then travels by its own means or auxiliary means (not shown) over the loop 36 or any other turning arrangement which brings it back to the point E in reversed position. The carriage 18 has retained its position and it may be easily again connected to the vehicle 10. It will be noted that the plug 28 now cooperates with the receptacle 30 arranged on the opposite side of the vehicle 10.

The same carriage is not necessarily associated with the same vehicle, particularly when several vehicles travel on the same circuit.

What is claimed is:

1. An electrical distribution and current collecting system for permitting a vehicle to travel on a single track portion of a tracking in either direction with the same end of said vehicle forward and means for engaging said vehicle forwardly on said single-track portion at both ends thereof, comprising current carrying conductor means extending on only one side of said single-track portion parallel thereto, current collecting carriage means movable along said conductor means in electrical contact relation therewith, electrical and mechanical plug in coupling means on said carriage means for electrical feeding of said vehicle and for driving of said carriage means by said vehicle, respectively, and mating electrical and mechanical coupling means on both sides of and on said vehicle for selective coupling with said plug in coupling means according to the direction of movement of said vehicle on said single-track portion.

* * * * *